US010732490B2

(12) United States Patent
Zhou et al.

(10) Patent No.: US 10,732,490 B2
(45) Date of Patent: Aug. 4, 2020

(54) CONTROL DEVICE, IMAGING SYSTEM, MOVABLE OBJECT, CONTROL METHOD, AND PROGRAM

(71) Applicant: SZ DJI TECHNOLOGY CO., LTD., Shenzhen (CN)

(72) Inventors: Changbo Zhou, Tokyo (JP); Ming Shao, Tokyo (JP)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/400,787

(22) Filed: May 1, 2019

(65) Prior Publication Data

US 2019/0258143 A1 Aug. 22, 2019

Related U.S. Application Data

(63) Continuation of application No. PCT/JP2016/084348, filed on Nov. 18, 2016.

(51) Int. Cl.

| | |
|---|---|
| ***G03B 17/56*** | (2006.01) |
| ***H04N 5/225*** | (2006.01) |
| ***H04N 5/232*** | (2006.01) |
| ***G03B 5/00*** | (2006.01) |
| ***G03B 17/00*** | (2006.01) |

(Continued)

(52) U.S. Cl.

CPC ........... *G03B 17/561* (2013.01); *F16M 13/04* (2013.01); *G03B 5/00* (2013.01); *G03B 15/00* (2013.01); *G03B 17/00* (2013.01); *G03B 17/56* (2013.01); *H04N 5/2251* (2013.01); *H04N 5/2252* (2013.01); *H04N 5/232* (2013.01); *H04N 5/2328* (2013.01); *H04N 5/23206* (2013.01); *H04N 5/23258* (2013.01); *H04N 5/23296* (2013.01)

(58) Field of Classification Search

CPC ........ G03B 17/561; G03B 5/00; G03B 15/00; G03B 17/00; G03B 17/56; H04N 5/2252; H04N 5/23206; H04N 5/23258; H04N 5/2328; H04N 5/23296; H04N 5/2251; H04N 5/232; F16M 13/04

USPC .............................. 348/208.99, 208.1–208.8

See application file for complete search history.

(56) References Cited

U.S. PATENT DOCUMENTS

| | | | | |
|---|---|---|---|---|
| 2006/0091844 A1 | 5/2006 | Shibatani | | |
| 2006/0158545 A1* | 7/2006 | Hirai | H04N 5/23248 348/333.01 | |

(Continued)

FOREIGN PATENT DOCUMENTS

| | | |
|---|---|---|
| JP | S63166371 A | 7/1988 |
| JP | H09130662 A | 5/1997 |

(Continued)

OTHER PUBLICATIONS

World Intellectual Property Organization (WIPO) International Search Report for PCT/JP2016/084348 dated Jan. 31, 2017 5 Pages.

*Primary Examiner* — Yogesh K Aggarwal

(74) *Attorney, Agent, or Firm* — Anova Law Group, PLLC

(57) ABSTRACT

A control device includes a control circuitry. The control circuitry is configured to control a carrier supporting an imaging device based on a rotation pattern for imparting a desired effect to an image captured by the imaging device. The carrier rotatably supports the imaging device to rotate about at least one axis.

18 Claims, 13 Drawing Sheets

114
200
116
100
202
112
107
101
106
105
102
104
103
10

(51) Int. Cl.
*F16M 13/04* (2006.01)
*G03B 15/00* (2006.01)

(56) References Cited

U.S. PATENT DOCUMENTS

| | | | | |
|---|---|---|---|---|
| 2008/0055753 | A1* | 3/2008 | Takahashi ................ | G02B 7/08 359/824 |
| 2009/0231450 | A1* | 9/2009 | Tanaka ..................... | G03B 5/02 348/208.7 |
| 2012/0229661 | A1* | 9/2012 | Sekiguchi ............ | A61B 5/0205 348/208.4 |
| 2013/0150122 | A1* | 6/2013 | Kulas .................. | H04M 1/0264 455/556.1 |
| 2013/0342715 | A1* | 12/2013 | Nakayama ......... | H04N 5/23267 348/208.11 |

FOREIGN PATENT DOCUMENTS

| | | | | |
|---|---|---|---|---|
| JP | H09326951 | A | | 12/1997 |
| JP | 11064706 | A | * | 3/1999 |
| JP | 3204705 | B2 | | 9/2001 |
| JP | 2002311498 | A | | 10/2002 |
| JP | 2006129597 | A | | 5/2006 |
| JP | 2011176415 | A | | 9/2011 |

* cited by examiner

CONTROL DEVICE, IMAGING SYSTEM, MOVABLE OBJECT, CONTROL METHOD, AND PROGRAM

CROSS-REFERENCE TO RELATED APPLICATION

This application is a continuation of International Application No. PCT/JP2016/084348, filed on Nov. 18, 2016, the entire content of which is incorporated herein by reference.

The scope of the claims, specification, drawings, and abstract include matters subject to protection by copyright. The owner of copyright does not raise objections to duplication by any person of these documents if it is as displayed in the files or records of the Patent Office. However, in all other cases, all copyrights are reserved.

FIELD

The disclosed embodiments relate to a control device, an imaging system, a movable object, a control method, and a program.

BACKGROUND

Japanese Unexamined Publication No. 2011-176415 describes controlling operations of an imaging device in conjunction with switching between image signals from the imaging device, or in conjunction with image processing to apply an effect to the image signals.

Patent Literature 1 Japanese Unexamined Publication No. 2011-176415

An imaging device rotatably supported by a carrier may be unable, while using the carrier, to impart a desired effect to an image captured by the imaging device.

A control device according to an aspect of the present disclosure can include a control unit for rotating an imaging device by controlling a carrier rotatably supporting the imaging device to rotate about at least one axis, the control unit executing the control on the basis of a first rotation pattern for imparting a desired effect to an image captured by the imaging device.

The control device can include a detector for detecting shaking of the imaging device. The control unit can identify a second rotation pattern for minimizing the shaking of the imaging device that is detected by the detector. The control unit can rotate the imaging device by controlling the carrier on the basis of a third rotation pattern, which is based on the first rotation pattern and the second rotation pattern.

The control unit can receive an instruction for one first rotation pattern from among a plurality of first rotation patterns that impart different desired effects to the image captured by the imaging device. The control unit can rotate the imaging device by controlling the carrier, on the basis of the designated first rotation pattern.

The control unit can receive instructions for timing the rotation of the imaging device. The control unit can rotate the imaging device according to the specified timing by controlling the carrier.

The control unit can, while rotating the imaging device by controlling the carrier on the basis of the first rotation pattern, issue an instruction to the imaging device so as to control at least one of a zoom action or a focus action of the imaging device in order to impart the desired effect to the image captured by the imaging device.

The control unit can, while rotating the imaging device on the basis of the first rotation pattern, issue an instruction to the imaging device to move an imaging element provided to the imaging device and a lens causing light to strike the imaging element, the imaging element and the lens being moved relative to each other in a direction other than an optical axis in order to impart the desired effect to the image captured by the imaging device.

The control unit can acquire biometric information of an organism. The control unit can select, on the basis of the biometric information, one first rotation pattern from among a plurality of first rotation patterns that impart different desired effects to the image captured by the imaging device.

The first rotation pattern can impart to the image an effect expressing at least one of tension, shock, being in an earthquake, or dizziness.

A control device according to another aspect of the present disclosure can include a control unit for rotating an imaging device by controlling a carrier rotatably supporting the imaging device to rotate about at least one axis. The control unit can acquire biometric information of an organism. The control unit can generate, on the basis of the biometric information, a first rotation pattern for imparting a desired effect to the image captured by the imaging device. The control unit can rotate the imaging device by controlling the carrier on the basis of the generated first rotation pattern.

The control device can include a detector for detecting shaking of the imaging device. The control unit can identify a second rotation pattern for minimizing the shaking of the imaging device that is detected by the detector. The control unit can rotate the imaging device by controlling the carrier on the basis of a third rotation pattern, which is based on the generated first rotation pattern and the second rotation pattern.

An imaging system according to another aspect of the present disclosure can include the control device; the imaging device; and the carrier. The imaging system can include a holding arm attached to the carrier.

A movable object according to another aspect of the present disclosure can include the imaging system.

A control method according to another aspect of the present disclosure can include rotating an imaging device by controlling a carrier rotatably supporting the imaging device to rotate about at least one axis, the control being executed on the basis of a first rotation pattern for imparting a desired effect to an image captured by the imaging device.

A program according to another aspect of the present disclosure can cause a computer to rotate an imaging device by controlling a carrier rotatably supporting the imaging device to rotate about at least one axis, the control being executed on the basis of a first rotation pattern for imparting a desired effect to an image captured by the imaging device.

A control method according to another aspect of the present disclosure can include acquiring biometric information of an organism. The control method can include generating, on the basis of the biometric information, a first rotation pattern for imparting a desired effect to an image captured by an imaging device. The control method can include rotating the imaging device by controlling, on the basis of the first rotation pattern, a carrier rotatably supporting the imaging device to rotate about at least one axis.

A program according to another aspect of the present disclosure can cause a computer to acquire biometric information of an organism. The program can cause the computer to generate, on the basis of the biometric information, a first rotation pattern for imparting a desired effect to an image captured by an imaging device. The program can cause the computer to rotate the imaging device by controlling, on the basis of the first rotation pattern, a carrier rotatably supporting the imaging device to rotate about at least one axis.

An imaging device rotatably supported by a carrier can, while using the carrier, impart a desired effect to an image captured by the imaging device.

The features described above can also be arranged into a variety of sub-combinations.

DETAILED DESCRIPTION OF THE EMBODIMENTS

Figure 1:
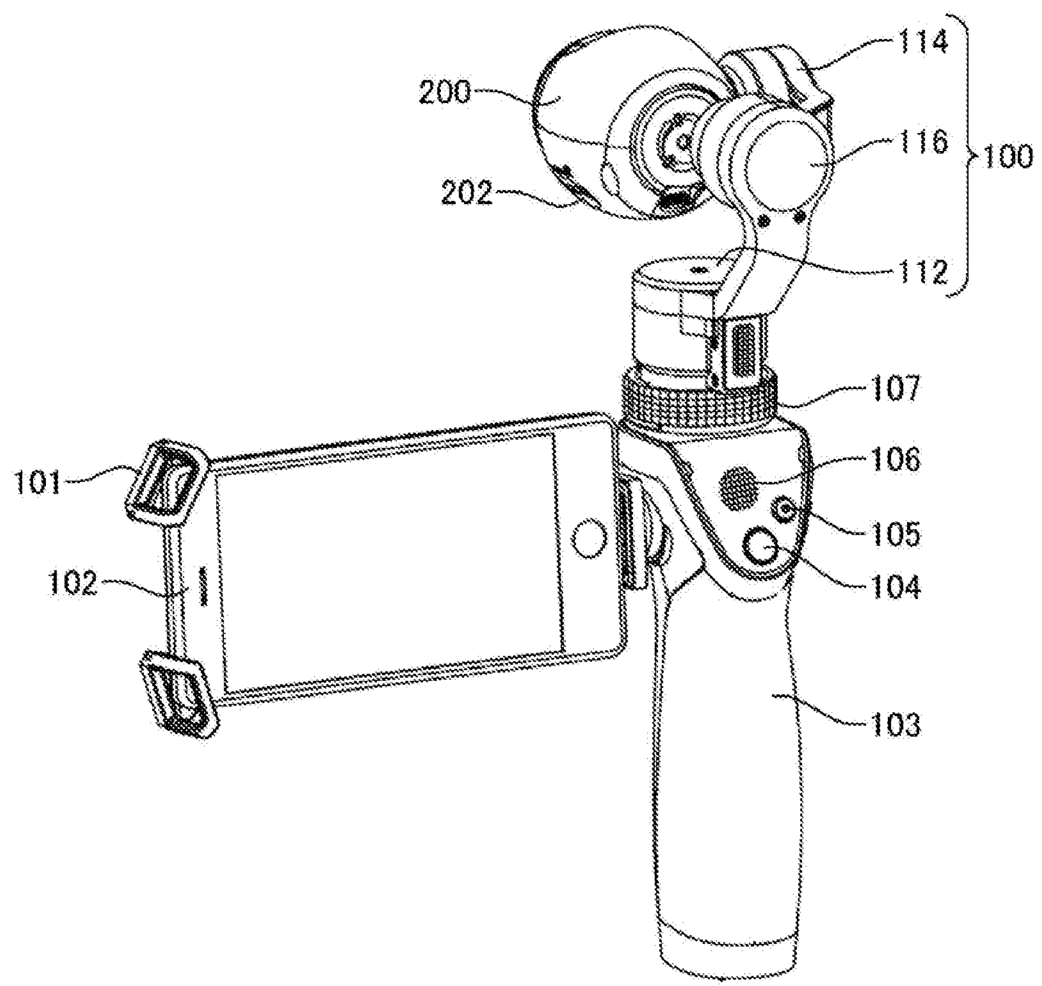
FIG. 1 is an exterior perspective view of one example of a stabilizer according to an embodiment.

The present disclosure is described below using embodiments of the disclosure, but the embodiments below do not limit the disclosure according to the scope of the claims. Not all combinations of features described in the embodiments are necessary to achieve the disclosure.

The various embodiments of the present disclosure can be described referencing flowcharts and block diagrams. In such depictions, the blocks can illustrate (1) a step of a process that executes an operation, or (2) a "unit" of a device having a role in executing an operation. A specific step or "unit" can be implemented through a programmable circuitry and/or a processor. A dedicated circuitry can include a digital and/or analog hardware circuitry. An integrated circuitry (IC) and/or discrete circuitry can be included. A programmable circuitry can include a reconfigurable hardware circuitry. The reconfigurable hardware circuitry can include a memory element, such as a logical AND, logical OR, logical XOR, logical NAND, logical NOR, and other logical operations; a flip-flop; a register; a field programmable gate array (FPGA); and a programmable logic array (PLA).

A computer-readable medium can include any tangible device that can store instructions to be executed by a suitable device. As a result, a computer-readable medium having instructions stored thereon can include a manufactured good that includes instructions that can be executed to create means for executing operations designated in a flowchart or a block diagram. As for examples of computer-readable media, electronic recording media, magnetic recording media, optical recording media, electromagnetic recording media, semiconductor recording media, and the like can be included. As for more specific examples of computer-readable media, floppy Discs®, diskettes, hard discs, random access memory (RAM), read-only memory (ROM), erasable programmable read-only memory (EPROM or flash memory), electrically erasable programmable read-only memory (EEPROM), static random access memory (SRAM), compact disc read-only memory (CD-ROM), digital versatile disc (DVD), Blu-ray® discs, memory sticks, integrated circuitry cards, and the like can be included.

Computer-readable instructions can include either source code or object code written in any combination of one or more programming languages. The source code or object code can include a conventional procedural programming language. The conventional procedural programming language can be: assembler instructions; instruction set architecture (ISA) instructions; machine instructions; machine-dependent instructions; microcode; firmware instructions; state setting data; an object-oriented programming language such as Smalltalk, JAVA®, C++, or the like; "C" programming language; or a similar programming language. The computer-readable instructions can be provided to a processor or programmable circuitry of a general-purpose computer, a special-purpose computer, or another programmable data processing device either locally or via a local area network (LAN) or a wide area network (WAN) such as the Internet. The processor or programmable circuitry can execute computer-readable instructions in order to create means for executing the operations designated in a flowchart or block diagram. Examples of a processor can include a computer processor, a processing unit, a microprocessor, a digital signal processor, a controller, a microcontroller, and the like.

FIG. 1 is an exterior perspective view of one example of a stabilizer 10 according to an embodiment. The stabilizer 10 can include a gimbal 100, an imaging device 200, and a holding arm 103. The stabilizer 10 is one example of a control device and imaging system. The gimbal 100 can rotatably support the imaging device 200. The gimbal 100 can include a yaw axis rotation mechanism 112, a pitch axis rotation mechanism 114, and a roll axis rotation mechanism 116. The gimbal 100 can rotatably support the imaging device 200 to rotate about at least one of a yaw axis (pan axis), a pitch axis (tilt axis), or a roll axis.

The imaging device 200 can include a slot 202 for inserting memory. The gimbal 100 can be fixed to the holding arm 103 via a holder 107. The holding arm 103 can include various buttons for operating the gimbal 100 and the imaging device 200. The holding arm 103 can include a shutter button 104, a record button 105, and an operation button 106 as a user interface. By pressing down the shutter button 104, a still image can be recorded by the imaging device 200. By pressing down the record button 105, a moving image can be recorded by the imaging device 200.

A device holder 101 can be fixed to the holding arm 103. The device holder 101 can hold a mobile device 102 such as a smart phone. The mobile device 102 can be connected to the stabilizer 10 via a wireless network such as WiFi, so as to be capable of communication. Thus, an image captured by the imaging device 200 can be displayed on a screen of the mobile device 102. The mobile device 102 can function as a user interface to control at least one of the gimbal 100 or the imaging device 200.

The stabilizer 10 can rotate the imaging device 200 using the gimbal 100 to compensate for any camera shake from a user holding the stabilizer 10. The gimbal 100 can rotate the imaging device 200 about at least one of the yaw axis or the pitch axis, for example, to compensate for the camera shake.

With the stabilizer 10 configured in this way, the gimbal 100 can be used to impart a variety of effects to the image captured by the imaging device 200.

Figure 2:
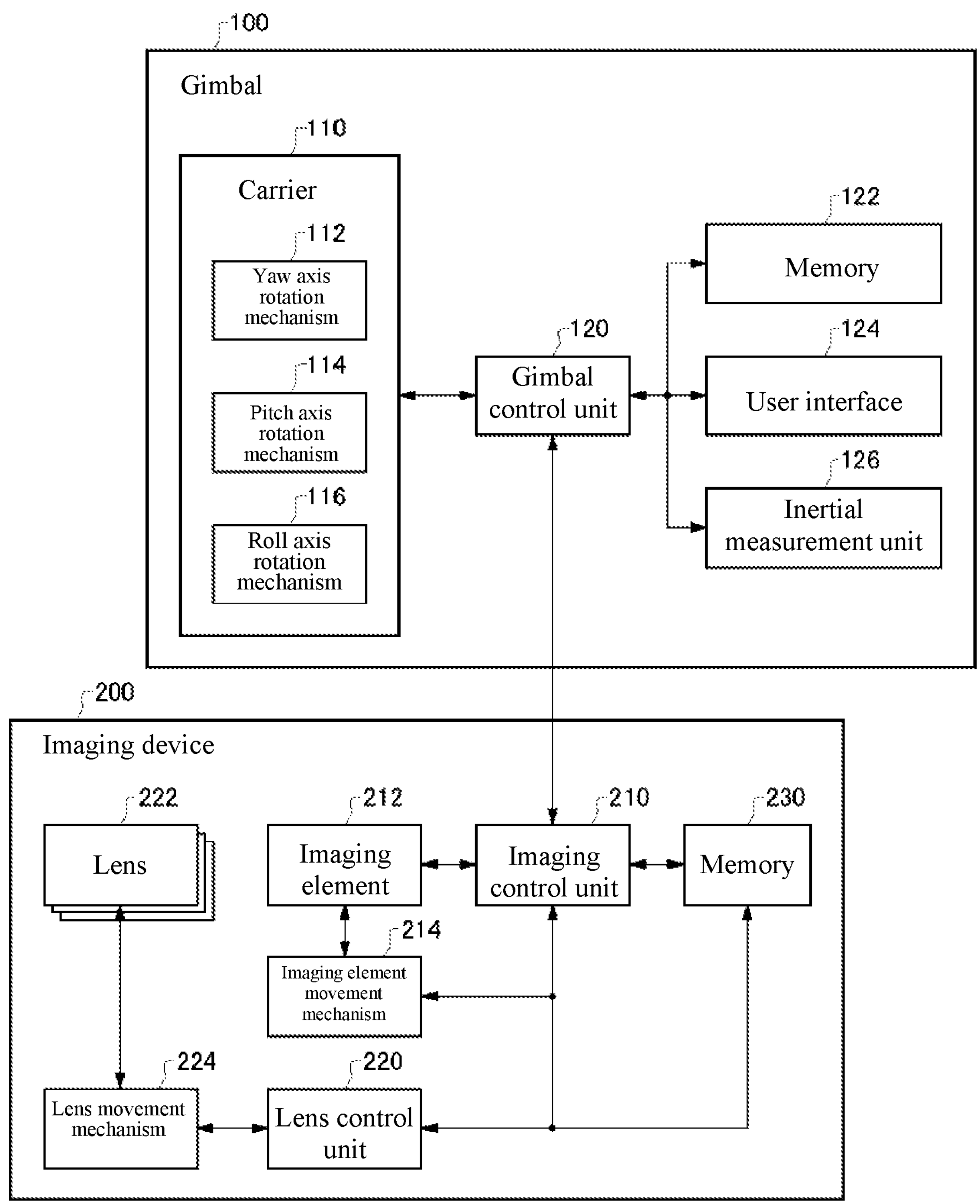
FIG. 2 illustrates one example of a function block for a stabilizer 10 according to the embodiment.

FIG. 2 illustrates one example of a function block for the stabilizer 10 according to the present embodiment. The stabilizer 10 can include the gimbal 100 and the imaging device 200. The gimbal 100 can include a carrier 110, a gimbal control unit 120, a memory 122, a user interface 124, and an inertial measurement unit 126. The carrier 110 can include the yaw axis rotation mechanism 112, the pitch axis rotation mechanism 114, and the roll axis rotation mechanism 116. The yaw axis rotation mechanism 112 can rotate the imaging device 200 centered around the yaw axis. The pitch axis rotation mechanism 114 can rotate the imaging device 200 centered around the pitch axis. The roll axis rotation mechanism 116 can rotate the imaging device 200 centered around the roll axis.

The gimbal control unit 120 can control the rotation of the imaging device 200 that is performed by the carrier 110. The gimbal control unit 120 is one example of a control unit. The gimbal control unit 120 can be configured from a microprocessor such as a CPU or MPU, a microcontroller such as an MCU, or the like. The memory 122 can store programs and the like necessary for the gimbal control unit 120 to control the carrier 110. The memory 122 can be a computer-readable recording medium, and can include at least one from among SRAM, DRAM, EPROM, EEPROM, and flash memory such as USB memory. The memory 122 can be provided to a housing of the stabilizer 10. The memory 122 can be provided such that it is removable from the housing of the stabilizer 10. The gimbal control unit 120 can cause the stabilizer 10 to function as an imaging system.

The user interface 124 can accept an instruction from the user. The user interface 124 can include, for example, the shutter button 104, the record button 105, and the operation button 106. The inertial measurement unit (IMU) 126 can detect shaking of the imaging device 200. The inertial measurement unit 126 can detect an angular velocity and acceleration of the imaging device 200 on the yaw axis, pitch axis, and roll axis as parameters indicating that the imaging device 200 is shaking. The inertial measurement unit 126 is one example of a detection unit that can detect shaking of the imaging device 200. The inertial measurement unit 126 can be provided to the imaging device 200. The inertial measurement unit 126 can be provided to at least one of the gimbal 100 or the imaging device 200.

The imaging device 200 can include an imaging control unit 210, an imaging element 212, an imaging element movement mechanism 214, a lens control unit 220, a plurality of lenses 222, a lens movement mechanism 224, and a memory 230. The imaging control unit 210 can be configured from a microprocessor such as a CPU or MPU, a microcontroller such as an MCU, or the like. The imaging control unit 210 can control the imaging device 200 according to action instructions for the imaging device 200 provided from the gimbal control unit 120. The memory 230 can be a computer-readable recording medium, and can include at least one from among SRAM, DRAM, EPROM, EEPROM, and flash memory such as USB memory. The memory 230 can be provided inside the housing of the imaging device 200. The memory 230 can be provided such that it is removable from the housing of the imaging device 200.

The imaging element 212 can be configured from CCD or CMOS. The imaging element 212 is carried inside the housing of the imaging device 200, and can generate and output to the imaging control unit 210 image data of an optical image formed via the plurality of lenses 222. The imaging control unit 210 can store image data output from the imaging element 212 in the memory 230. The imaging control unit 210 can also output image data to the memory 122 to be stored therein, via the gimbal control unit 120.

The lens control unit 220 can control the movement of the plurality of lenses 222 via the lens movement mechanism 224. All or a portion of the plurality of lenses 222 can be moved along an optical axis by the lens movement mechanism 224. Following lens action instructions from the imaging control unit 210, the lens control unit 220 can move at least one of the plurality of lenses 222 along the optical axis. The lens movement mechanism 220 can move at least one of the plurality of lenses 222 along the optical axis, and can thereby carry out at least one of the zoom action or a focus action.

The imaging element movement mechanism 214 can move the imaging element 212 in a direction other than the optical axis so as to compensate for camera shake. The imaging element movement mechanism 214 can move the imaging element 212 in a direction other than the optical axis and relative to the plurality of lenses 222 so as to compensate for the camera shake. The imaging element movement mechanism 214 can move the imaging element 212 in a first direction vertically perpendicular to the optical axis. The imaging element movement mechanism 214 can move the imaging element 212 in a second direction that differs from the vertical first direction. The imaging element movement mechanism 214 can rotate the imaging element 212 about the optical axis. The imaging device 200 can achieve a camera shake correction function by using the imaging element movement mechanism 214 to move the imaging element 212 relative to the optical axis. The imaging device 200 can move the plurality of lenses 222, instead of the imaging element 212, in a direction other than the optical axis. The imaging device 200 can change a refraction direction of the light by moving any of the plurality of lenses 222 in a direction other than the optical axis. The imaging device 200 can thereby move the imaging element 212 in a direction other than the optical axis and relative to the plurality of lenses 222. "Camera shake" can refer to, for example, instability due to an outside force acting on the stabilizer 10 or to a mechanical tremor generated within the stabilizer 10.

With the stabilizer 10 configured in this way, the gimbal control unit 120 can rotate the imaging device 200 by controlling the carrier 110 on the basis of a first rotation pattern that imparts a desired effect to an image captured by the imaging device 200. The desired effect can be an effect imparted to the image by deliberately rotating the imaging device 200 when capturing an image with the imaging device 200. The desired effect can also be an effect imparted to a moving image by deliberately rotating the imaging device 200 when capturing a moving image with the imaging device 200. The moving image having the desired effect can include any or all of the following: a video with a shaky view, a video with a finely vibrating view, a video with a view that shakes periodically, and a video with a rotating view.

The gimbal control unit 120 can rotate the imaging device 200 by controlling the carrier 110 on the basis of the first rotation pattern, which is established ahead of time. By controlling the carrier 110 on the basis of the first rotation pattern, the gimbal control unit 120 can periodically rotate the imaging device 200 such that the imaging device 200 rotates alternatingly in a first direction and a second direction that is the opposite of the first direction. The gimbal control unit 120 can identify a second rotation pattern that minimizes the shaking of the imaging device 200 that is detected by the inertial measurement unit 126. The gimbal control unit 120 can rotate the imaging device 200 by controlling the carrier 110 on the basis of a third rotation pattern, which is based on the first rotation pattern and the second rotation pattern. The gimbal control unit 120 can use a composite rotation pattern, which combines the first rotation pattern and the second rotation pattern, as the third rotation pattern.

Using the user interface 124, the user can specify a first rotation pattern from among a plurality of first rotation patterns that impart different desired effects to the image captured by the imaging device 200. The gimbal control unit 120 can receive this user designation of one first rotation pattern. The gimbal control unit 120 can rotate the imaging device 200 by controlling the carrier 110 on the basis of the designated first rotation pattern. The user interface 124 can specify one first rotation pattern from among a plurality of first rotation patterns in response to an instruction from the user.

The gimbal control unit 120 can further receive instructions for timing the rotation of the imaging device 200. The gimbal control unit 120 can receive the instructions for timing the rotation of the imaging device 200 via the user interface 124. The user interface 124 can specify the timing for rotating the imaging device 200 in response to an instruction from the user. By controlling the carrier 110, the gimbal control unit 120 can rotate the imaging device 200 according to the timing specified through the user interface 124.

FIGS. 3 to 6 illustrate examples of the first rotation pattern. FIGS. 3 to 6 illustrate the first rotation pattern as changes over time in the rotation angle in each of the pitch axis, yaw axis, and roll axis. The gimbal control unit 120 can rotate the imaging device 200 on the basis of the first rotation pattern, and can thereby reflect an emotion the user wishes to express through the rotation of the imaging device 200.

Figure 3:
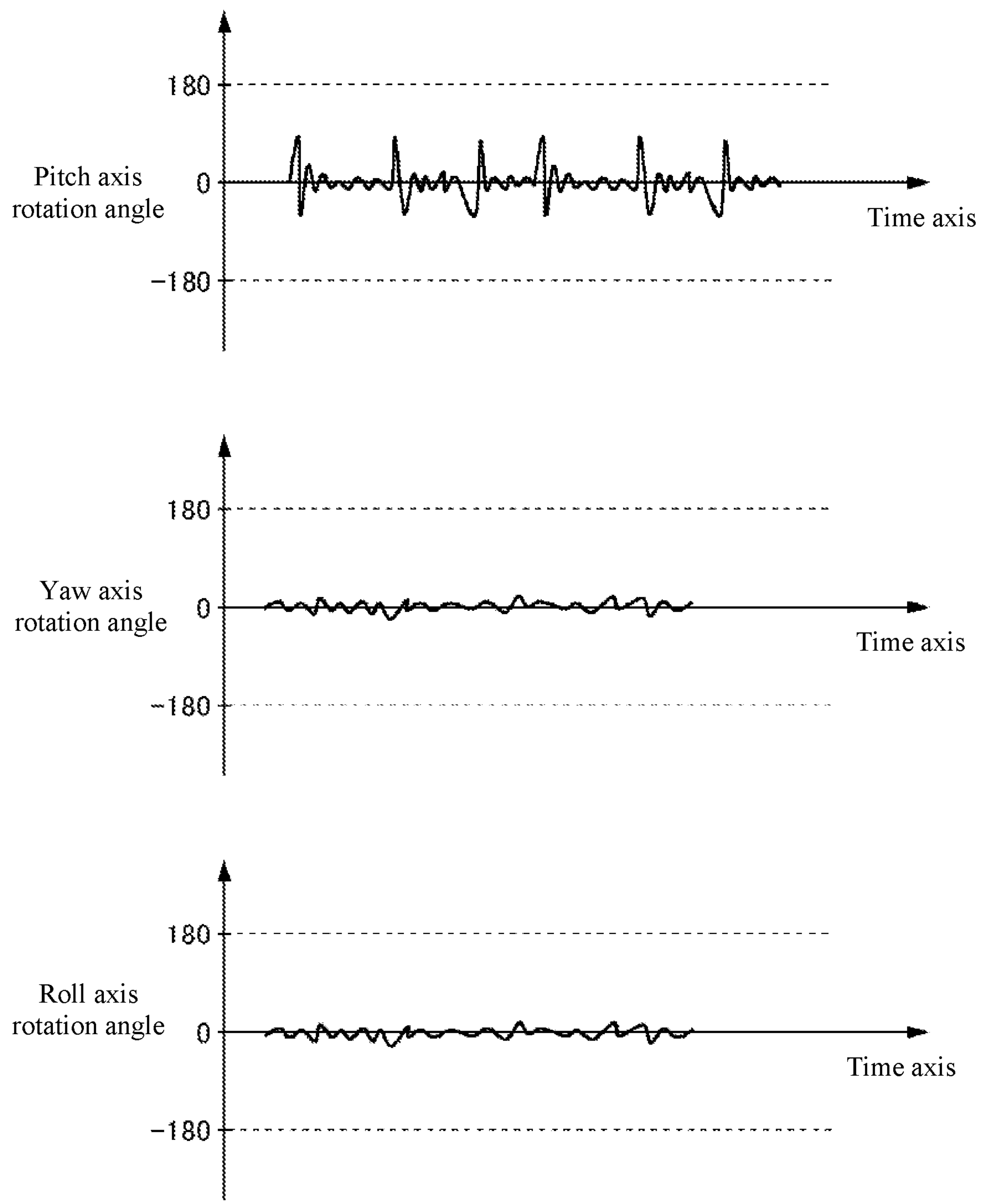
FIG. 3 illustrates one example of a first rotation pattern.
Figure 4:
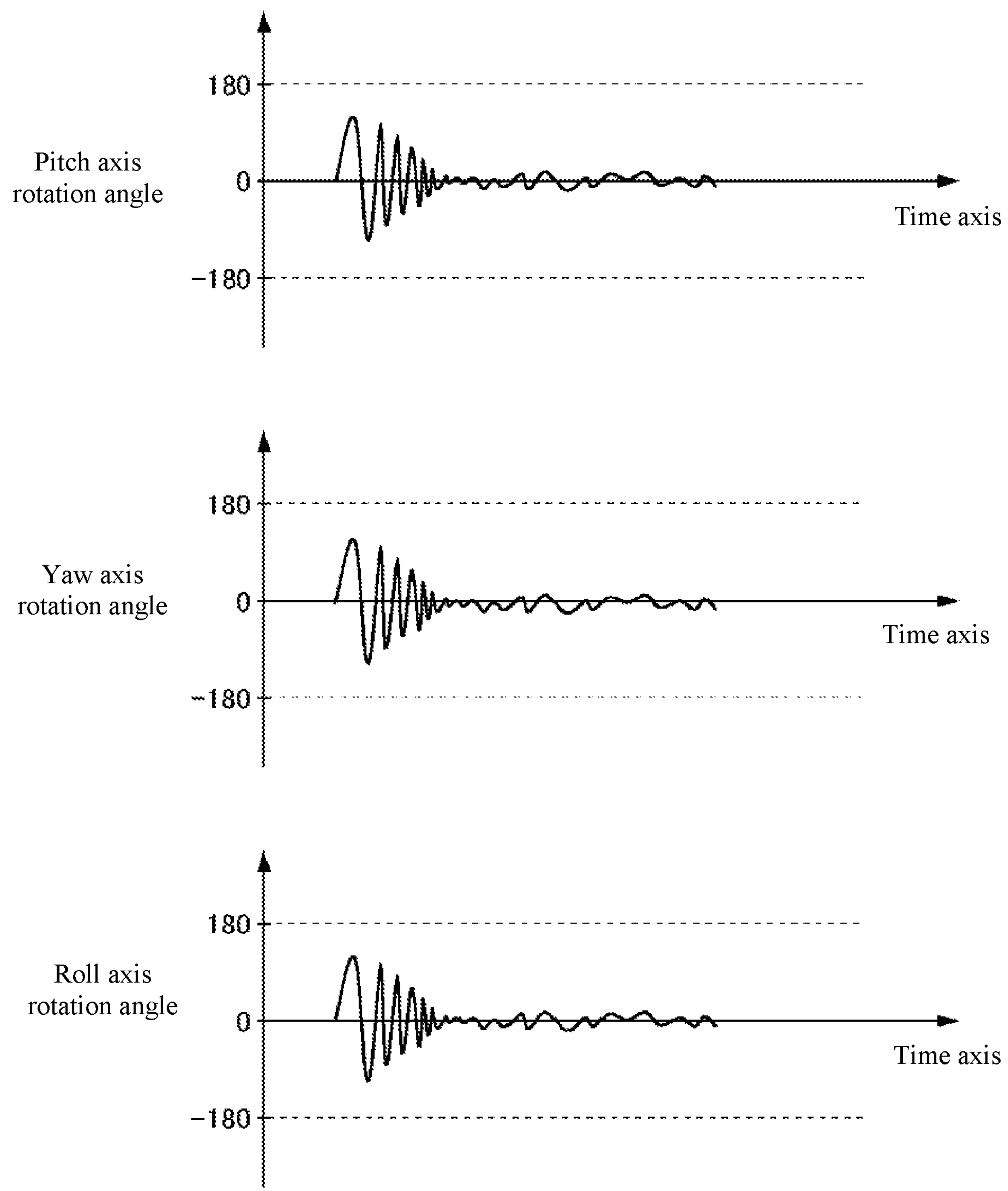
FIG. 4 illustrates another example of the first rotation pattern.
Figure 5:
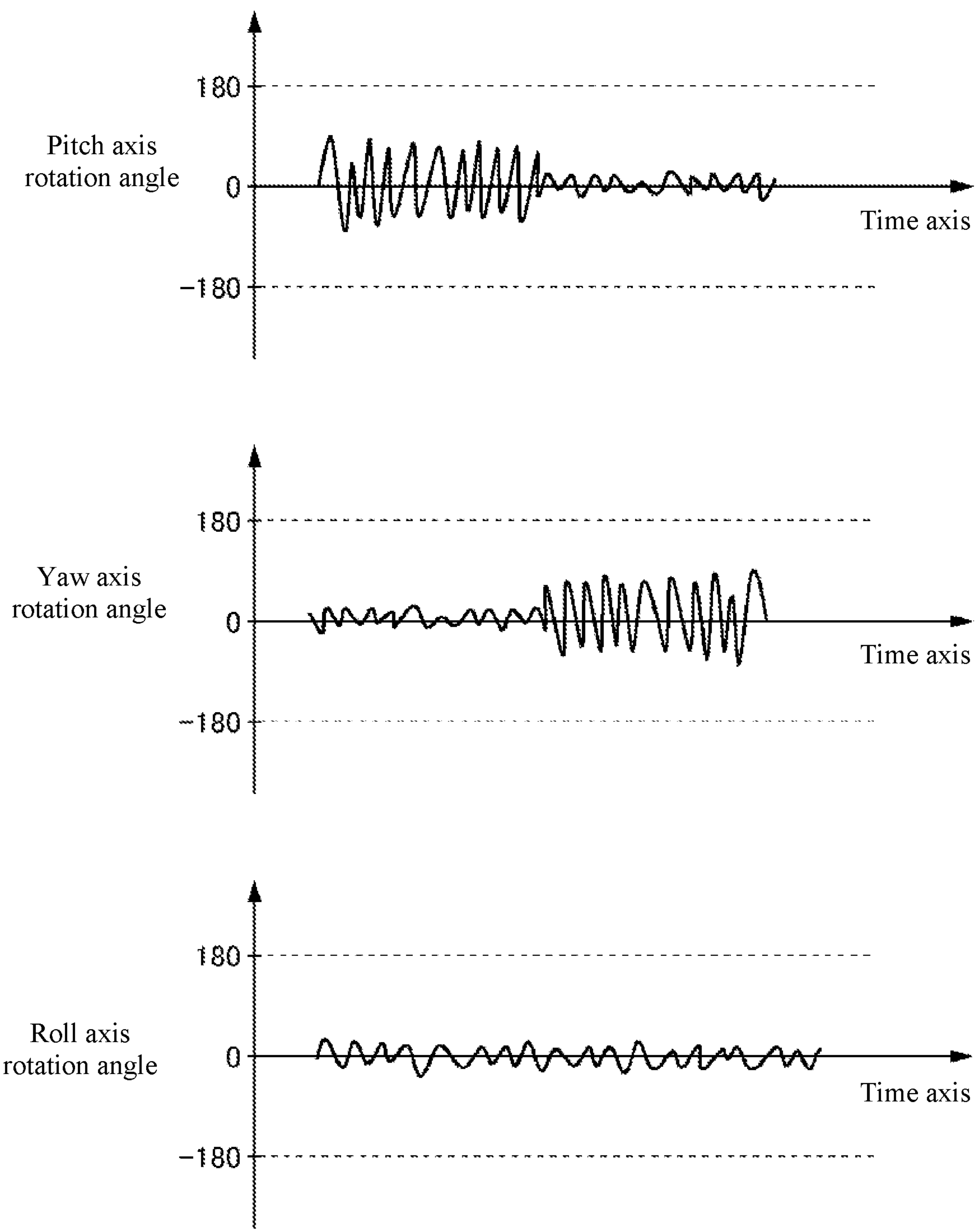
FIG. 5 illustrates another example of the first rotation pattern.
Figure 6:
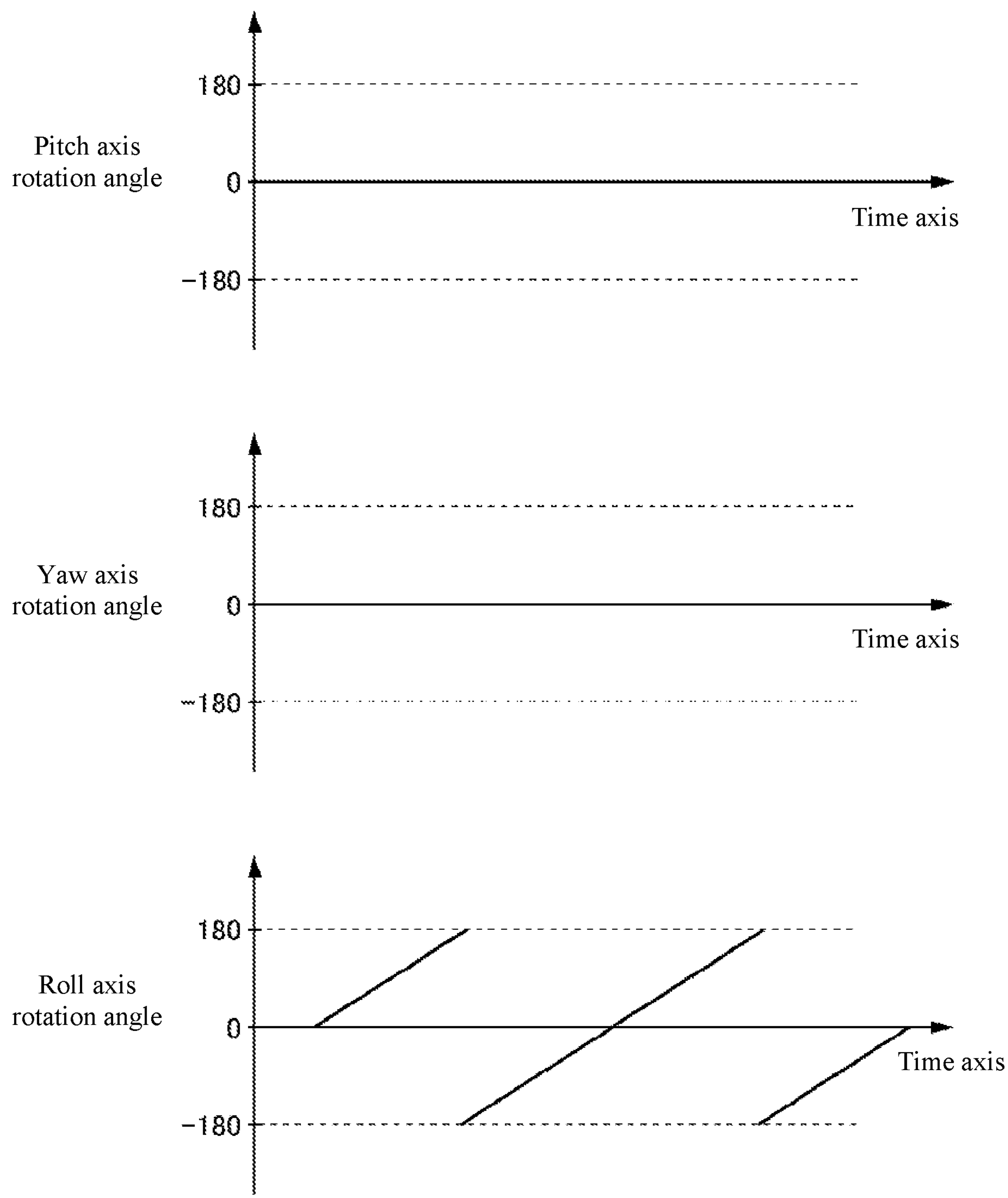
FIG. 6 illustrates another example of the first rotation pattern.

FIG. 3 is one example of the first rotation pattern, where the user is expressing tension. FIG. 4 is another example of the first rotation pattern, where the user is expressing shock. FIG. 5 is another example of the first rotation pattern, where the user is expressing being in an earthquake. FIG. 6 is another example of the first rotation pattern, where the user is expressing dizziness. The gimbal control unit 120 can also rotate the imaging device 200 by controlling the carrier 110 on the basis of a rotation pattern other than the first rotation patterns illustrated in FIGS. 3 to 6.

In addition to rotating the imaging device 200, the gimbal control unit 120 can also impart a desired effect to an image using a function provided to the imaging device 200. While rotating the imaging device 200 on the basis of the first rotation pattern, the gimbal control unit 120 can issue an instruction to the imaging device 200 so as to control at least one of the zoom action or the focus action of the imaging device 200 in order to impart a desired effect to the image captured by the imaging device 200. The imaging device 200 can receive the instruction from the gimbal control unit 120 and, via the lens control unit 220, can move all or a portion of the plurality of lenses 222 along the optical axis, and can thereby carry out at least one of the zoom action or the focus action.

While rotating the imaging device 200 on the basis of the first rotation pattern, the gimbal control unit 120 can issue an instruction to the imaging device 200 to move the imaging element 212 relative to the optical axis in order to impart the desired effect to the image captured by the imaging device 200. The imaging device 200 can receive the instruction from the gimbal control unit 120 and move the imaging element 212 relative to the optical axis via the imaging element movement mechanism 214.

The plurality of first rotation patterns can be stored in the memory 122 of the gimbal 100. In such a case, the first rotation pattern specified by the user via the user interface 124 can be retrieved from the memory 122 by the gimbal control unit 120, and the gimbal control unit 120 can control the carrier 110 on the basis of the retrieved first rotation pattern.

The first rotation pattern can also be transmitted to the gimbal control unit 120 via the user interface 124. In such a case, the plurality of first rotation patterns can be stored in another memory on the user interface 124 side. For example, the mobile device 102 that is fixed to the stabilizer 10 can be used as the user interface 124. The mobile device 102 can store the plurality of first rotation patterns in an internal memory. The mobile device 102 can retrieve the first rotation pattern specified by the user from the internal memory and can transmit the retrieved first rotation pattern to the gimbal control unit 120. The gimbal control unit 120 can control the carrier 110 on the basis of the first rotation pattern received from the mobile device 102. The mobile device 102 can also acquire the first rotation pattern via the network and can provide the acquired first rotation pattern to the gimbal control unit 120.

Figure 7:
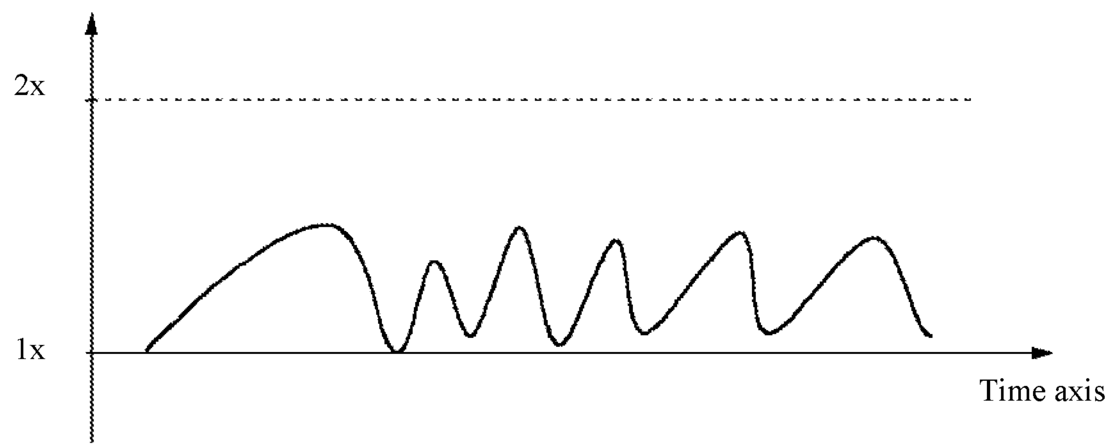
FIG. 7 illustrates one example of a change over time in a zoom action.
Figure 8:
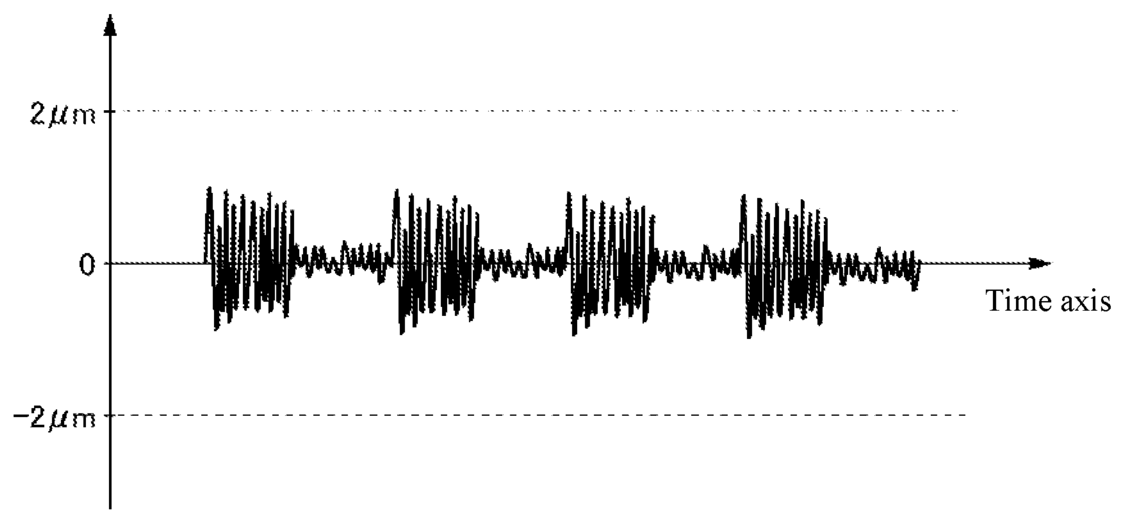
FIG. 8 illustrates one example of a change over time in a movement amount of an imaging element.

FIG. 7 illustrates one example of a change over time in the zoom action, where the user is expressing being in an earthquake. While controlling the carrier 110 on the basis of the first rotation pattern illustrated in FIG. 5, the gimbal control unit 120 can send an instruction to the imaging device 200 to execute the zoom action according to the action pattern depicted in FIG. 7. FIG. 8 illustrates one example of a change over time in a movement amount of the imaging element 212, where the user is expressing being in an earthquake. While controlling the carrier 110 on the basis of the first rotation pattern illustrated in FIG. 5, the gimbal control unit 120 can send an instruction to the imaging device 200 to move the imaging element 212 by the movement amount depicted in FIG. 8. The imaging control unit 210 can receive the instruction from the gimbal control unit 120 and move the imaging element 212 along a first direction that is vertically perpendicular to the optical axis, for example, via the imaging element movement mechanism 214. By making such use of functionality already present in the imaging device 200, in addition to rotating the imaging device 200, a greater variety of effects can be imparted to the image.

Figure 9:
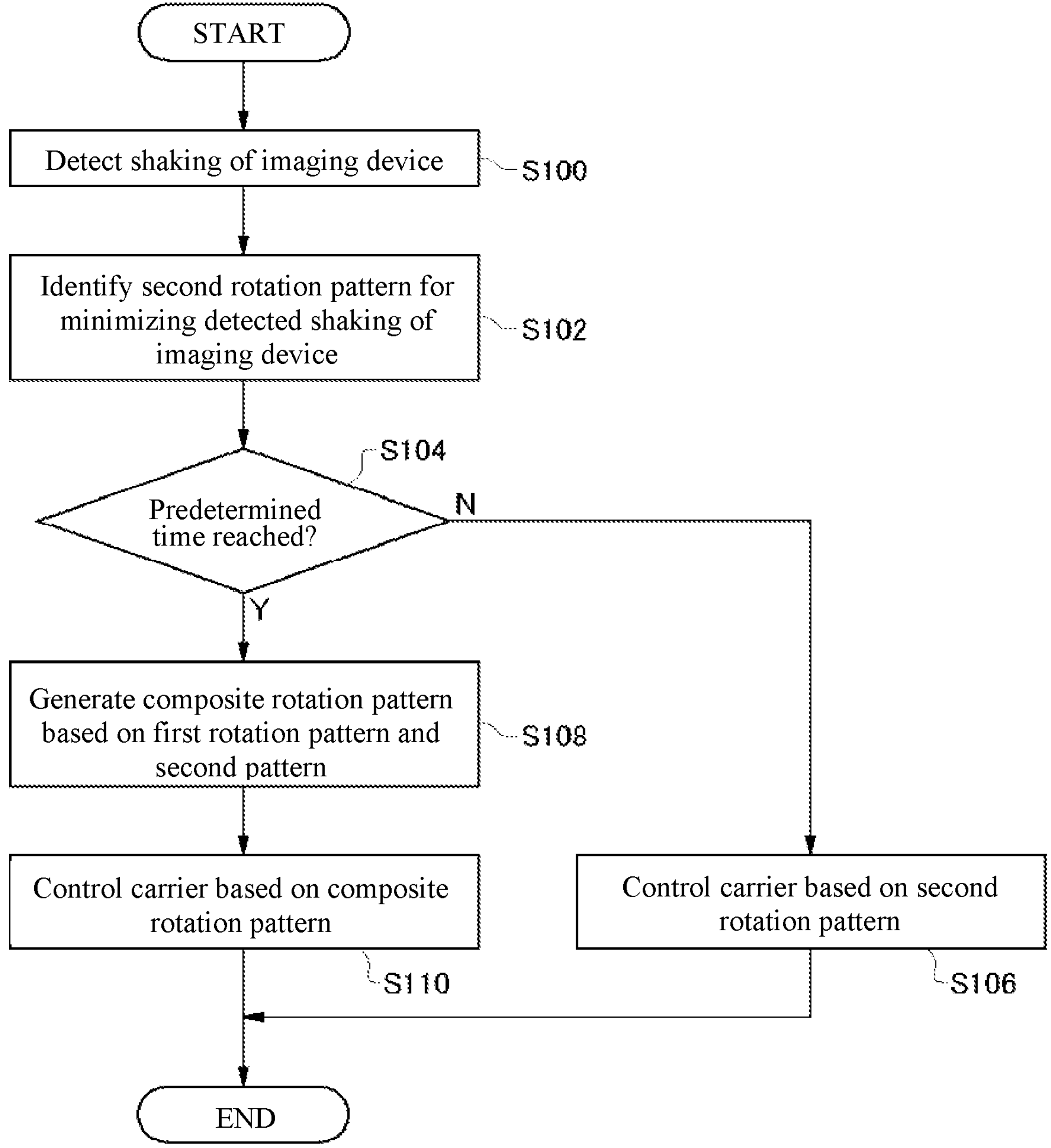
FIG. 9 is a flowchart illustrating one example of a procedure for a gimbal control unit to control a carrier.

FIG. 9 is a flowchart illustrating one example of a procedure for the gimbal control unit 120 to control the carrier 110. The gimbal control unit 120 can detect the shaking of the imaging device 200 via the inertial measurement unit 126 (S100). The gimbal control unit 120 can identify a second rotation pattern that minimizes the detected shaking of the imaging device 200 (S102). Next, the gimbal control unit 120 can determine whether a predetermined point in time has been reached for executing control based on the first rotation pattern. For example, the gimbal control unit 120 can determine whether a time specified by the user via the user interface 124 has been reached. Also, the gimbal control unit 120 can determine whether an instruction to execute control based on the first rotation pattern has been received from the user via the user interface 124, for example.

If the predetermined time has not been reached, the gimbal control unit 120 can control the carrier 110 on the basis of the second rotation pattern (S106). The gimbal control unit 120 can, for example, control the carrier 110 such that the imaging device 200 rotates by $-\alpha$ about the pitch axis in order to minimize the shaking of the imaging device 200.

Conversely, if the predetermined time has been reached, the gimbal control unit 120 can generate a composite rotation pattern on the basis of the first rotation pattern (specified by the user via the user interface 124) and the second rotation pattern (S108). The gimbal control unit 120 can control the carrier 110 on the basis of the generated composite rotation pattern (S110). For example, rotation of the imaging device 200 about the pitch axis and based on the first rotation pattern is expressed as $\theta(°)$, and rotation of the imaging device 200 about the pitch axis and based on the second rotation pattern is expressed as $-\alpha(°)$. Given this, the gimbal control unit 120 can control the carrier 110 such that the imaging device 200 rotates by $\theta-\alpha(°)$ about the pitch axis.

As described above, using the stabilizer 10 according to the present embodiment, a desired effect can be imparted to an image through rotation of the imaging device 200 by rotating the imaging device 200 using the gimbal 100.

In the above, an example is described where the user specifies, via the user interface 124, the first rotation pattern that imparts the desired effect to the image, selected from among a plurality of first rotation patterns. However, the gimbal control unit 120 can also automatically select, from among the plurality of first rotation patterns, a first rotation pattern that imparts to the image an effect that corresponds to the surrounding environment. The gimbal control unit 120 can acquire biometric information of a specific organism (for example, the user) and can select the first rotation pattern from among the plurality of first rotation patterns on the basis of the acquired biometric information. The gimbal control unit 120 can generate, on the basis of the biometric information, a first rotation pattern that imparts a desired effect to the image captured by the imaging device 200. The gimbal control unit 120 can rotate the imaging device 200 by controlling the carrier 110 on the basis of the first rotation pattern that has been selected or generated based on the biometric information.

Figure 10:
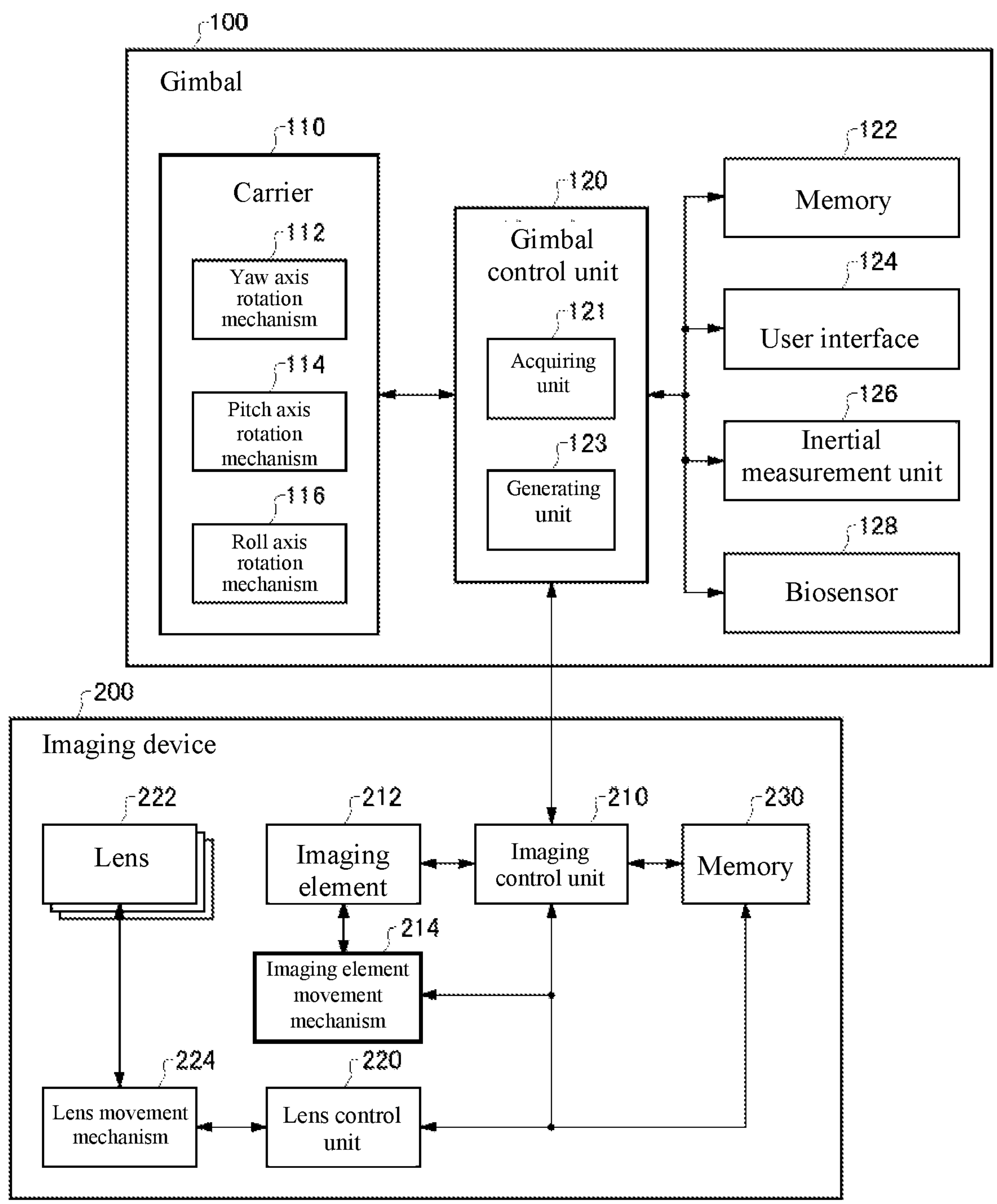
FIG. 10 illustrates one example of a function block for a stabilizer according to another embodiment.

FIG. 10 illustrates one example of a function block for the stabilizer 10 according to another embodiment. The stabilizer 10 depicted in FIG. 10 differs from the stabilizer 10 depicted in FIG. 2 in that, in the stabilizer 10 of FIG. 10, the gimbal 100 can include a biosensor 128, and the gimbal control unit 120 can include an acquiring unit 121 and a generating unit 123.

The biosensor 128 can detect a status of a specific living organism. For example, the biosensor 128 can detect at least one of a user's pulse, pulse wave, electrocardiogram waves (QRS complex or the like), brainwaves, body temperature, or physical movement. The memory 122 can store a first rotation pattern for each status of the organism identified by the biometric information. The memory 122 can, for example, store a first rotation pattern for each of a plurality of predetermined pulse ranges. The acquiring unit 121 can acquire biometric information indicating the status of the organism detected by the biosensor 128. The gimbal control unit 120 can select the first rotation pattern from among the plurality of first rotation patterns stored in the memory 122 on the basis of the biometric information acquired via the biosensor 128.

The generating unit 123 can generate, on the basis of the biometric information acquired by the acquiring unit 121, a first rotation pattern that imparts a desired effect to the image captured by the imaging device 200. The generating unit 123 can distinguish the status of the user based on the biometric information, for example. The generating unit 123 can generate a first rotation pattern that imparts to an image an effect appropriate to the status of the user. Based on the biometric information, the generating unit 123 can distinguish whether the user is, for example, in a calm state, a first excited state, or a second excited state having a higher level of excitement than the first excited state. The generating unit 123 can generate a first rotation pattern in response to the identified status. The generating unit 123 can generate a first rotation pattern for each state, in which a wave frequency increases in order from the calm state, to the first excited state, to the second excited state. The generating unit 123 can also generate a first rotation pattern corresponding to a period exhibited by the user's pulse wave, brainwaves, or the like.

Figure 11:
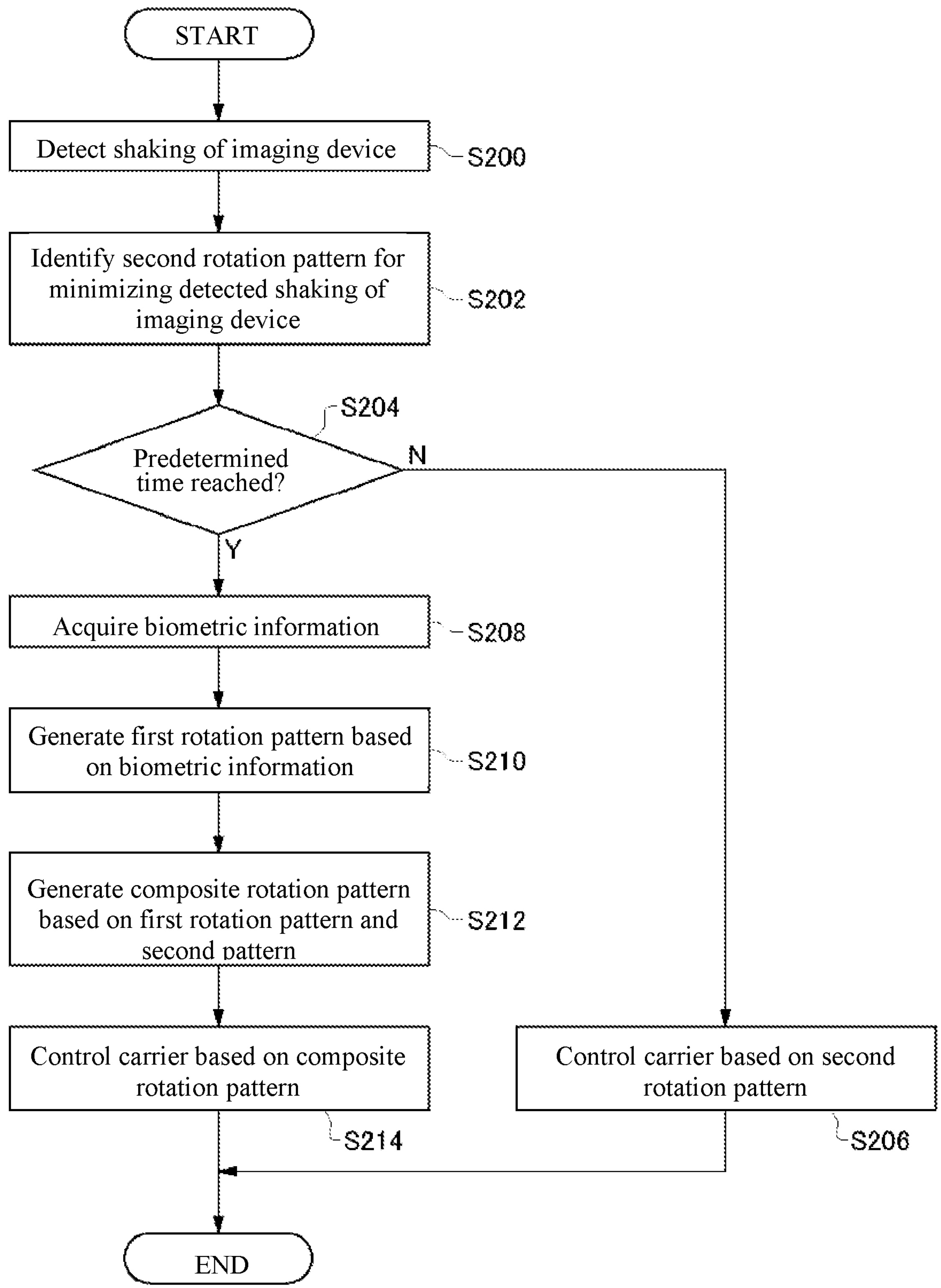
FIG. 11 is a flowchart illustrating one example of a procedure for a gimbal control unit to control a carrier on the basis of a first rotation pattern that is based on biometric information.

FIG. 11 is a flowchart illustrating one example of a procedure for the gimbal control unit 120 to control the carrier 110 according to a first rotation pattern based on biometric information.

The gimbal control unit 120 can detect the shaking of the imaging device 200 via the inertial measurement unit 126 (S200). The gimbal control unit 120 can identify a second rotation pattern that minimizes the detected shaking of the imaging device 200 (S202). Next, the gimbal control unit 120 can determine whether a predetermined point in time has been reached for executing control based on the first rotation pattern (S204). If the predetermined time has not been reached, the gimbal control unit 120 can control the carrier 110 on the basis of the second rotation pattern (S206).

Conversely, if the predetermined time has been reached, the acquiring unit 121 can acquire the user's biometric information via the biosensor 128 (S208). The generating unit 123 can generate a first rotation pattern on the basis of the acquired biometric information (S210). Next, based on the first rotation pattern and the second rotation pattern, the gimbal control unit 120 can generate a composite rotation pattern (S212). The gimbal control unit 120 can control the carrier 110 on the basis of the generated composite rotation pattern (S214).

As described above, the gimbal control unit 120 can distinguish the status of the user based on biometric information, and can generate a first rotation pattern appropriate to the user's status. Accordingly, by rotating the imaging device 200 with the gimbal 100 in response to the user's status, a desired effect corresponding to the user's status can be imparted to the image captured by the imaging device 200.

In the embodiment described above, an example using the gimbal 100 provided to the stabilizer 10 is described. However, a desired effect can also be imparted to the image captured by the imaging device 200 by mounting the gimbal 100 in a movable object such as an unmanned aerial vehicle (UAV) and using the gimbal 100 to rotate the imaging device 200.

Figure 12:
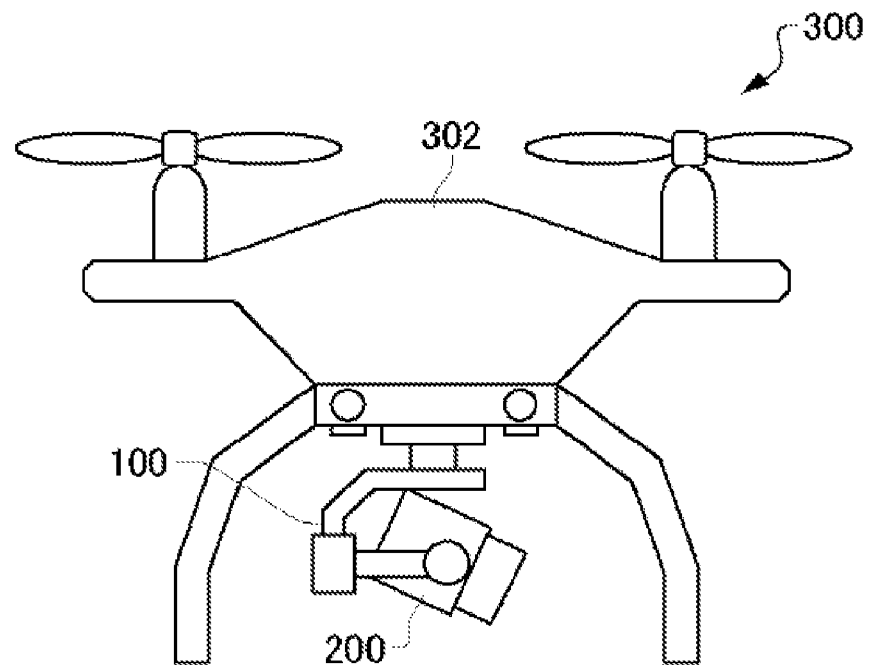
FIG. 12 illustrates one example of a system that includes a UAV and a remote controller according to another embodiment.
Figure 12:
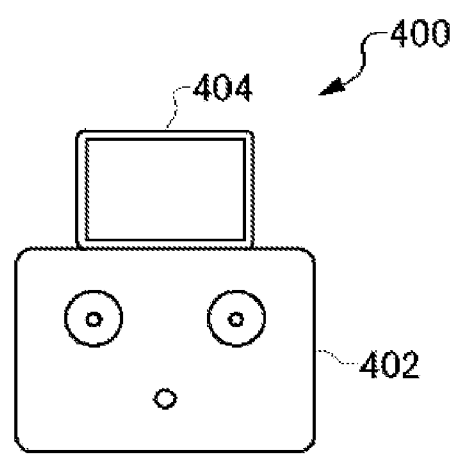

FIG. 12 illustrates one example of a system that includes a UAV 300 and a remote controller 400 according to another embodiment. The UAV 300 can include a UAV body 302, the gimbal 100, and the imaging device 200. The UAV 300 is one example of a movable object to which the imaging device 200 is provided. The movable object can be a concept that includes, in addition to UAVs, other aerial vehicles moving in the air, vehicles moving on the ground, ships moving in the water, and the like.

The UAV body 302 can include a plurality of rotary wings. The UAV body 302 can cause the UAV 300 to fly by controlling the rotation of the plurality of rotary wings. For example, the UAV body 302 can cause the UAV 300 to fly by using four rotary wings. The number of rotary wings is not limited to four. Also, the UAV 300 can be a fixed-wing aircraft that does not have rotary wings.

The remote controller 400 can include an operation unit 402 and a display unit 404. The operation unit 402 can receive an input operation from the user for controlling an attitude of the UAV 300. Based on the user operation received by the operation unit 402, the remote controller 400 can transmit a signal for controlling the UAV 300.

The remote controller 400 can receive an image captured by the imaging device 200. The display unit 404 can display the image received by the remote controller 400. The display unit 404 can be a touch-type panel. The remote controller 400 can receive the user's input operation through the display unit 404. At least one of the operation unit 402 or the display unit 404 can function as a user interface.

Figure 13:
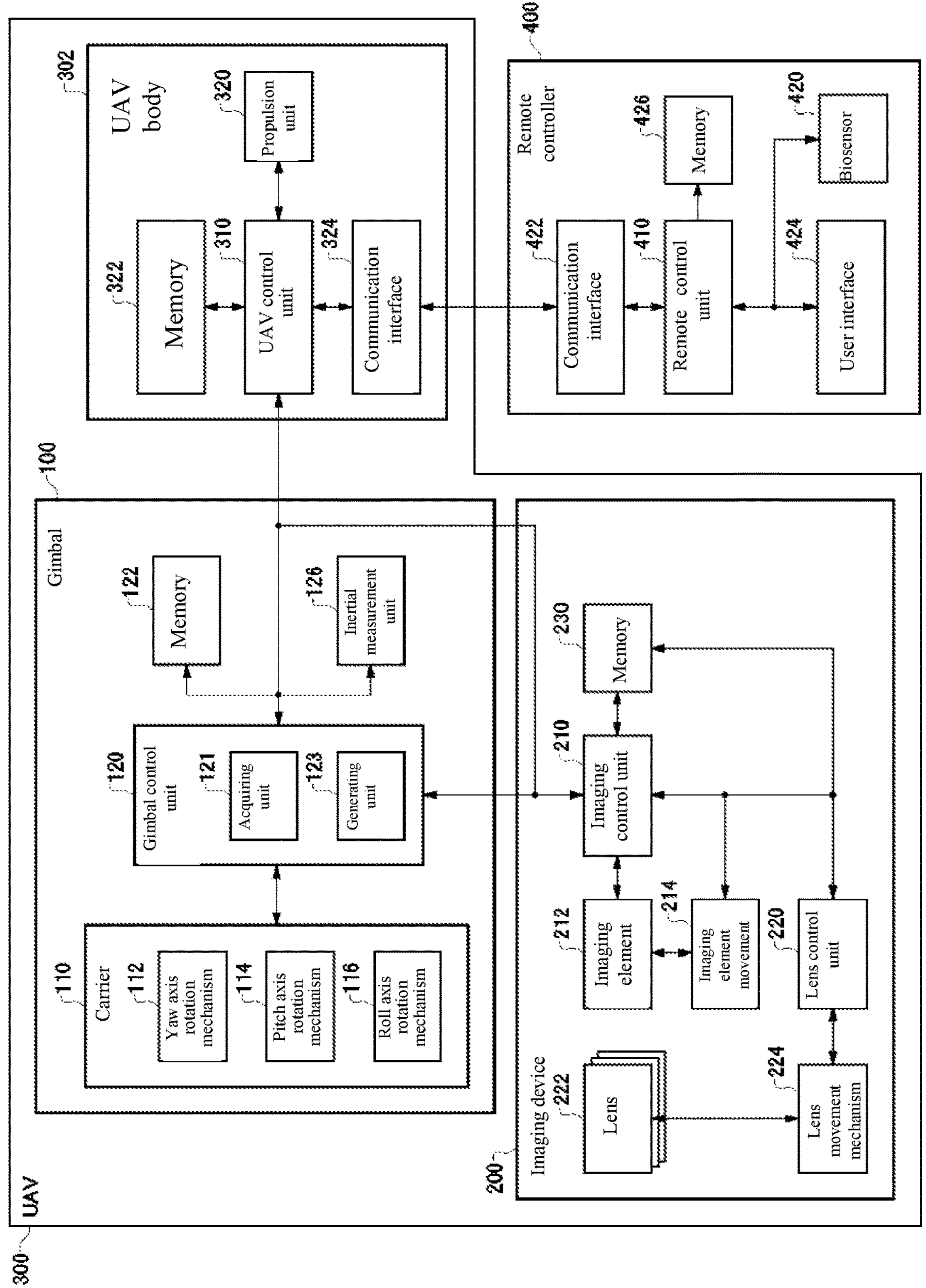
FIG. 13 illustrates one example of function blocks for the UAV and the remote controller.

FIG. 13 illustrates one example of function blocks for the UAV 300 and the remote controller 400. The UAV 300 can include the UAV body 302, the gimbal 100, and the imaging device 200. The remote controller 400 can include a remote control unit 410, a biosensor 420, a communication interface 422, a user interface 424, and a memory 426. Instead of providing the user interface 124 and the biosensor 128 to the gimbal 100, the user interface 424 and the biosensor 420 can be provided to the remote controller 400.

The UAV body 302 can include a UAV control unit 310, a propulsion unit 320, a memory 322, and a communication interface 324. The communication interface 324 can communicate with the remote controller 400. The communication interface 324 can receive a variety of instructions for the UAV control unit 310 from the remote controller 400. The memory 322 can store programs and the like necessary for the UAV control unit 310 to control the propulsion unit 320, the gimbal 100, and the imaging device 200. The memory 322 can be a recordable medium that is computer-readable, and can include at least one from among SRAM, DRAM, EPROM, EEPROM, and flash memory such as USB memory. The memory 322 can be provided inside the UAV body 302. The memory 322 can be provided such that it is detachable from the UAV body 302.

The UAV control unit 310 can control the flight and imaging of the UAV 300 by following a program stored in the memory 322. The UAV control unit 310 can be configured from a microprocessor such as a CPU or MPU, a microcontroller such as an MCU, or the like. The UAV control unit 310 can control the flight and imaging of the UAV 300 by following instructions received from the remote controller 400 via the communication interface 324. The propulsion unit 320 can propel the UAV 300. The propulsion unit 320 can have a plurality of rotary wings and a plurality of drive motors for rotating the plurality of rotary wings. The propulsion unit 320 can cause the UAV 300 to fly by rotating the plurality of rotary wings via the plurality of drive motors, following the instructions from the UAV control unit 310.

The plurality of first rotation patterns can be stored in the memory 122. In such a case, the gimbal control unit 120 can receive, via the UAV body 302, a control signal indicating the first rotation pattern specified by the user via the user interface 424. The gimbal control unit 120 can retrieve the first rotation pattern indicated by the control signal from the memory 122, and can control the carrier 110 on the basis of the retrieved first rotation pattern.

The plurality of first rotation patterns can be stored in the memory 426. In such a case, the user can specify, via the user interface 424, one first rotation pattern from among the plurality of first rotation patterns stored in the memory 426. The remote control unit 410 can retrieve the specified first rotation pattern from the memory 426 and can transmit the retrieved first rotation pattern to the UAV 300. The gimbal control unit 120 can receive the first rotation pattern from the UAV body 302. The gimbal control unit 120 can control the carrier 110 on the basis of the first rotation pattern received from the remote controller 400 via the UAV body 302.

The biosensor 420 can detect the status of a specific living organism. For example, the biosensor 420 can detect at least one of the pulse, pulse wave, electrocardiogram waves (QRS complex or the like), brainwaves, body temperature, or physical movement of the user operating the remote controller 400. The remote controller 400 can transmit to the gimbal 100, via the UAV body 302, biometric information indicating the status of the organism detected by the biosensor 420. The acquiring unit 121 can acquire the biometric information transmitted from the remote controller 400. The generating unit 123 can generate, on the basis of the biometric information acquired by the acquiring unit 121, a first rotation pattern that imparts a desired effect to the image captured by the imaging device 200. The gimbal control unit 120 can control the carrier 110 on the basis of the first rotation pattern generated by the generating unit 123. The biosensor 420 can be detachable from the remote controller 400.

With the UAV 300 configured in this way, the gimbal 100 can be used to deliberately rotate the imaging device 200 mounted in the UAV 300, and an image having a variety of effects imparted by the imaging device 200 can be captured.

Figure 14:
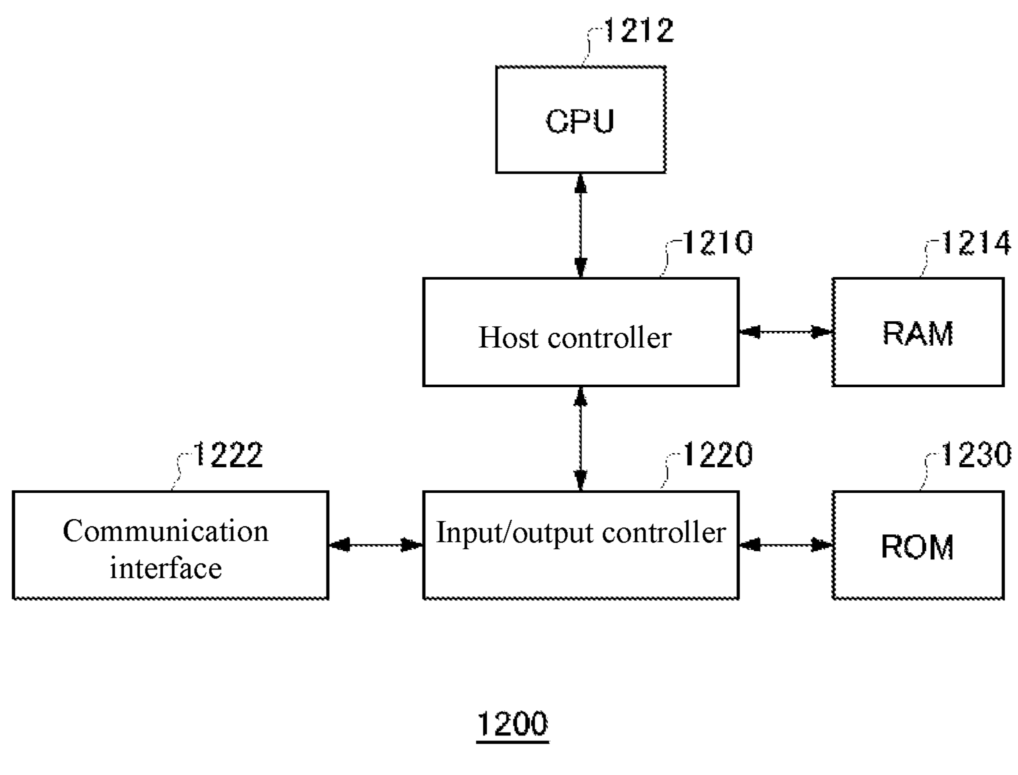
FIG. 14 illustrates one example of a hardware configuration.

FIG. 14 illustrates one example of a computer 1200 that can entirely or partially realize a plurality of aspects of the present disclosure. A program installed on the computer 1200 can cause the computer 1200 to function as operations related to devices according to an embodiment of the present disclosure, or as one or a plurality of "units" of the devices. Alternatively, the program can cause the computer 1200 to execute the operations or the one or plurality of "units." The program can cause the computer 1200 to execute a process or the steps of a process according to an embodiment of the present disclosure. Such a program can cause the computer 1200 to execute specific operations related to some or all of the blocks of the flowcharts and block diagrams described in the present specification by executing the program via a CPU 1212.

The computer 1200 according to the present embodiment can include the CPU 1212 and a RAM 1214, and these can be mutually connected by a host controller 1210. The computer 1200 can further include a communication interface 1222 and an input/output unit, and these can be connected to the host controller 1210 via an input/output controller 1220. The computer 1200 can further include a ROM 1230. The CPU 1212 can act in accordance with a program stored in the ROM 1230 and the RAM 1214, and can control each unit thereby.

The communication interface 1222 can communicate with other electronic devices via the network. A hard disc drive can store the programs and data to be used by the CPU 1212 of the computer 1200. The ROM 1230 can store therein boot programs and the like that are executed by the computer 1200 during activation and/or programs that depend on hardware of the computer 1200. The programs can be provided via a computer-readable recording medium like a CD-ROM, USB memory, or an IC card, or via a network. The programs can be installed on the RAM 1214 or the ROM 1230, which are examples of a computer-readable recording medium, and can be executed by the CPU 1212. The information processes written in these programs can be read by the computer 1200, and can bring about the coordination between the programs and the various types of hardware resources described above. Devices or methods can be configured by the manipulation or processing of information achieved through use of the computer 1200.

For example, when communication is carried out between the computer 1200 and an external device, the CPU 1212 can execute a communication program loaded in the RAM 1214, and can instruct the communication interface 1222 to perform communication processes based on the processes written in the communication program. Under the control of the CPU 1212, the communication interface 1222 can read sending data stored in a sending buffer processing region provided on a recording medium such as the RAM 1214 or USB memory, and can send the read sending data to the network, or can write receiving data received from the network to a receiving buffer processing region or the like provided on the recording medium.

Further, the CPU 1212 can make the entirety or necessary portions of files or a database stored on an external recording medium such as USB memory be read by the RAM 1214, and can execute a variety of types of processes relating to the data on the RAM 1214. The CPU 1212 then writes back the processed data to the external recording medium.

A variety of types of programs and a variety of types of information like data, tables, and databases can be stored on the recording medium and can accept information processing. The CPU 1212 can execute, on data read from the RAM 1214, a variety of types of processes designated by an instruction sequence of the program and described throughout the present disclosure, and can write back the results to the RAM 1214. The variety of types of processes can include a variety of types of operations, information processing, condition determination, conditional branching, unconditional branching, information search/replace, and the like. Further, the CPU 1212 can search the information in the files, databases, and the like on the recording medium. For example, a plurality of entries can be stored on the recording medium. Each of the plurality of entries can have an attribute value of a first attribute that is related to an attribute value of a second attribute. When the plurality of entries are stored on the recording medium, the CPU 1212 can search among the plurality of entries for an entry that matches the search conditions and has a designated attribute value for the first attribute. The CPU 1212 can then read the attribute value of the second attribute stored in the entry, and can thereby acquire the attribute value of the second attribute that is related to the first attribute that fulfills preset conditions.

The program or software module described above can be stored on the computer 1200 or on a computer-readable medium near the computer 1200. Further, a recording medium like a hard disc or RAM provided in a server system connected to a private communications network or the Internet can be used as the computer-readable medium, and the program can thereby be provided to the computer 1200 via the network.

The present disclosure is described using embodiments, but the technical scope of the disclosure is not limited to the scope of the above embodiments. It should be clear to a person skilled in the art that the above embodiments are open to various modifications or improvements. It should also be clear from the scope of the claims that forms having such modifications or improvements can be included in the technical scope of the present disclosure.

The order of each process in the operations, procedures, steps, stages, and the like of the devices, systems, programs, and methods in the scope of the claims, specification, and drawings is not specifically disclosed using "beforehand," "in advance," and the like, and any order is possible as long as a postprocess does not use the output of a preprocess. Even if "first," "next," and the like are used for convenience in describing the flow of operations in the scope of the claims, specification, and drawings, it is not meant that it must be executed in this order.

DESCRIPTION OF REFERENCE NUMERALS

10 Stabilizer
100 Gimbal
101 Device holder
102 Mobile device
103 Holding arm
104 Shutter button
105 Record button
106 Operation button
107 Holder
110 Carrier
112 Yaw axis rotation mechanism
114 Pitch axis rotation mechanism
116 Roll axis rotation mechanism
120 Gimbal control unit
121 Acquiring unit
122 Memory
123 Generating unit
124 User interface
126 Inertial measurement unit
128 Biosensor
200 Imaging device
202 Slot
210 Imaging control unit
212 Imaging element
214 Imaging element movement mechanism
220 Lens control unit
222 Lens
224 Lens movement mechanism
230 Memory
302 UAV body
310 Control unit
320 Propulsion unit
322 Memory
324 Communication interface
400 Remote controller
402 Operation unit
404 Display unit
410 Remote control unit
420 Biosensor
422 Communication interface
424 User interface
426 Memory
1200 Computer
1210 Host controller
1212 CPU
1214 RAM

1220 Input/output controller

1222 Communication interface

1230 ROM

What is claimed is:

1. A control device comprising:

a detector configured to detect shaking of an imaging device being supported by a carrier, the carrier rotatably supporting the imaging device to rotate about at least one axis; and a control circuitry configured to control the carrier based on a first rotation pattern of the imaging device, identify a second rotation pattern for minimizing the shaking of the imaging device, determine a third rotation pattern based on the first rotation pattern and the second rotation pattern, and to control the carrier to rotate the imaging device based on the third rotation pattern for imparting a desired effect to an image captured by the imaging device.

2. The control device of claim 1, wherein the control circuitry is further configured to receive an instruction designating one of a plurality of candidate rotation patterns as the rotation pattern, the plurality of candidate rotation patterns being configured to impart different desired effects to images captured by the imaging device.

3. The control device of claim 2, wherein the control circuitry is further configured to:

acquire biometric information of an organism; and select the rotation pattern from the plurality of candidate rotation patterns based on the biometric information.

4. The control device of claim 1, wherein the control circuitry is further configured to:

receive an instruction specifying timing for rotating the imaging device; and control the carrier to rotate the imaging device at the specified timing.

5. The control device of claim 1, wherein the control circuitry is further configured to, while controlling the carrier to rotate the imaging device based on the rotation pattern, send an instruction to the imaging device to control at least one of a zoom action or a focus action of the imaging device in order to impart the desired effect to the image captured by the imaging device.

6. The control device of claim 1, wherein the control circuitry is further configured to, while controlling the carrier to rotate the imaging device based on the rotation pattern, send an instruction to the imaging device to control at least one of an imaging element of the imaging device or a lens of the imaging device to move in a direction different from an optical axis of the lens in order to impart the desired effect to the image captured by the imaging device.

7. The control device of claim 1, wherein the control circuitry is further configured to:

acquire biometric information of an organism; and select, based on the biometric information, one of a plurality of candidate rotation patterns as the rotation pattern, the plurality of candidate rotation patterns being configured to impart different desired effects to images captured by the imaging device.

8. The control device of claim 1, wherein the rotation pattern is configured to impart to the image an effect expressing at least one of tension, shock, being in an earthquake, or dizziness.

9. The control device of claim 1, wherein the carrier is part of a gimbal.

10. The control device of claim 9, wherein the control circuitry is further configured to compensate for shaking of the imaging device caused by use of the gimbal.

11. The control device of claim 10, wherein the control circuitry is further configured to move an imaging element of the imaging device to compensate for the shaking.

12. The control device of claim 10, wherein the control circuitry is further configured to move at least one of a plurality of lenses of the imaging device to compensate for the shaking.

13. The control device of claim 1, wherein the rotation pattern is stored in a memory.

14. The control device of claim 1, wherein the rotation pattern is acquired via a network.

15. An imaging system comprising:

an imaging device;

a carrier rotatably supporting the imaging device to rotate about at least one axis;

a detector configured to detect shaking of the imaging device; and a control circuitry configured to control the carrier based on a first rotation pattern of the imaging device, identify a second rotation pattern for minimizing the shaking of the imaging device, determine a third rotation pattern based on the first rotation pattern and the second rotation pattern, and to control the carrier to rotate the imaging device based on the third rotation pattern for imparting a desired effect to an image captured by the imaging device.

16. The imaging system of claim 15, further comprising:

a mobile device configured to communicate with the control circuitry.

17. The imaging system of claim 15, further comprising:

a holding arm attached to the carrier.

18. A movable object provided with an imaging system, the imaging system comprising:

an imaging device;

a carrier rotatably supporting the imaging device to rotate about at least one axis;

a detector configured to detect shaking of the imaging device, and a control circuitry configured to control the carrier based on a first rotation pattern of the imaging device, identify a second rotation pattern for minimizing the shaking of the imaging device, determine a third rotation pattern based on the first rotation pattern and the second rotation pattern, and to control the carrier to rotate the imaging device based on the third rotation pattern for imparting a desired effect to an image captured by the imaging device.

* * * * *